United States Patent
Gerber et al.

(10) Patent No.: US 7,140,180 B2
(45) Date of Patent: Nov. 28, 2006

(54) WAVE ENERGY CONVERTER (WEC) DEVICE AND SYSTEM

(75) Inventors: James Gerber, St. Paul, MN (US); David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 7 days.

(21) Appl. No.: 10/762,800

(22) Filed: Jan. 22, 2004

(65) Prior Publication Data

US 2004/0163389 A1 Aug. 26, 2004

Related U.S. Application Data

(60) Provisional application No. 60/441,660, filed on Jan. 22, 2003.

(51) Int. Cl.
*F03C 1/00* (2006.01)
(52) U.S. Cl. .......................................... 60/496; 60/502
(58) Field of Classification Search ................. 60/495, 60/496, 501, 502
See application file for complete search history.

(56) References Cited

U.S. PATENT DOCUMENTS

| | | | | | |
|---|---|---|---|---|---|
| 3,546,473 | A | * | 12/1970 | Rich | 290/42 |
| 3,991,837 | A | * | 11/1976 | Crickmer | 175/27 |
| 4,914,915 | A | * | 4/1990 | Linderfelt | 60/502 |
| 5,347,186 | A | * | 9/1994 | Konotchick | 310/17 |
| 5,842,838 | A | * | 12/1998 | Berg | 417/331 |
| 6,392,314 | B1 | * | 5/2002 | Dick | 290/53 |
| 6,857,266 | B1 | * | 2/2005 | Dick | 60/496 |
| 6,864,592 | B1 | * | 3/2005 | Kelly | 290/42 |

* cited by examiner

*Primary Examiner*—Hoang Nguyen
(74) *Attorney, Agent, or Firm*—Henry I. Schanzer; Michael Y. Epstein (57) ABSTRACT

A wave energy converter system comprises two floats; a first being generally flat and heaving up and down in phase with passing surface waves on a body of water, and the second being elongated and heaving up and down out of phase with the passing waves. Preferably, the first float is annular with a central vertical opening therethrough, and the elongated float, with a weighted bottom end, extends vertically through the central opening of the first float. The two floats thus move out of phase with one another, thus providing a relatively large relative motion between the two floats giving rise to highly efficient energy conversion. Each float serves as a "ground" for the other; thus avoiding the need for anchoring the floats to the floor of the body of water.

7 Claims, 12 Drawing Sheets

WAVE ENERGY CONVERTER (WEC) DEVICE AND SYSTEM

This application claims the benefit of Provisional Application 60/441,660, filed Jan. 22, 2003, titled IMPROVED WAVE ENERGY CONVERTER (WEC) DEVICE AND SYSTEM, the subject matter of which is incorporated herein by reference.

BACKGROUND OF THE INVENTION

This invention relates to the conversion of energy present in surface waves on large bodies of water to useful energy.

In co-pending application, Ser. No. 10/357,675, filed Feb. 4, 2003, the subject matter of which is incorporated herein by reference, there is disclosed a surface wave energy conversion system comprising two separate, but interacting components, each for capturing energy from surface waves.

A first of the system components comprises a float on the water surface which bobs up and down in response to passing waves. Such bobbing motion tends to be in phase with the passing waves, i.e., the float rises in response to a passing cresting wave.

The second component of the system comprises a submerged member dependent from the float and including a compressible fluid responsive to water pressure variations. In response to an overpassing cresting surface wave and an increase in water pressure, the compressible fluid is compressed resulting in a decreased volume and corresponding decreased buoyancy of the second component. Thus, the second component tends to sink relative to the float in out-of-phase relation with the passing waves.

Of significance is that the two components tend to move in opposite directions in response to the same passing wave. Thus, by interconnecting an energy transducer, e.g., a linear electrical generator, between the two components, energy generation is obtained.

SUMMARY OF THE INVENTION

A wave energy converter comprises two floats, a first of which is configured to rise and fall generally in phase with passing surface waves on a body of water, and the second of which is configured to rise and fall generally out of phase with passing waves.

In one embodiment, the float comprises an annular member having a central opening, and the second float comprises an elongated spar disposed within the central opening for vertical out-of-phase movements relative to the first float; the wall of the central opening serving as a bearing for the moving spar.

An energy converter, e.g., a linear electrical generator, is connected between the two floats for converting relative movements therebetween into useful energy. Significantly, because energy is obtained from relative movements between the floats, neither needs to be anchored to the floor of the body of water.

BRIEF DESCRIPTION OF THE DRAWINGS

The drawings are schematic and not to scale.

FIG. 16 is a view in elevation of an inflatable system, shown in fully inflated configuration; while

DETAILED DESCRIPTION OF THE INVENTION

Figure 1:
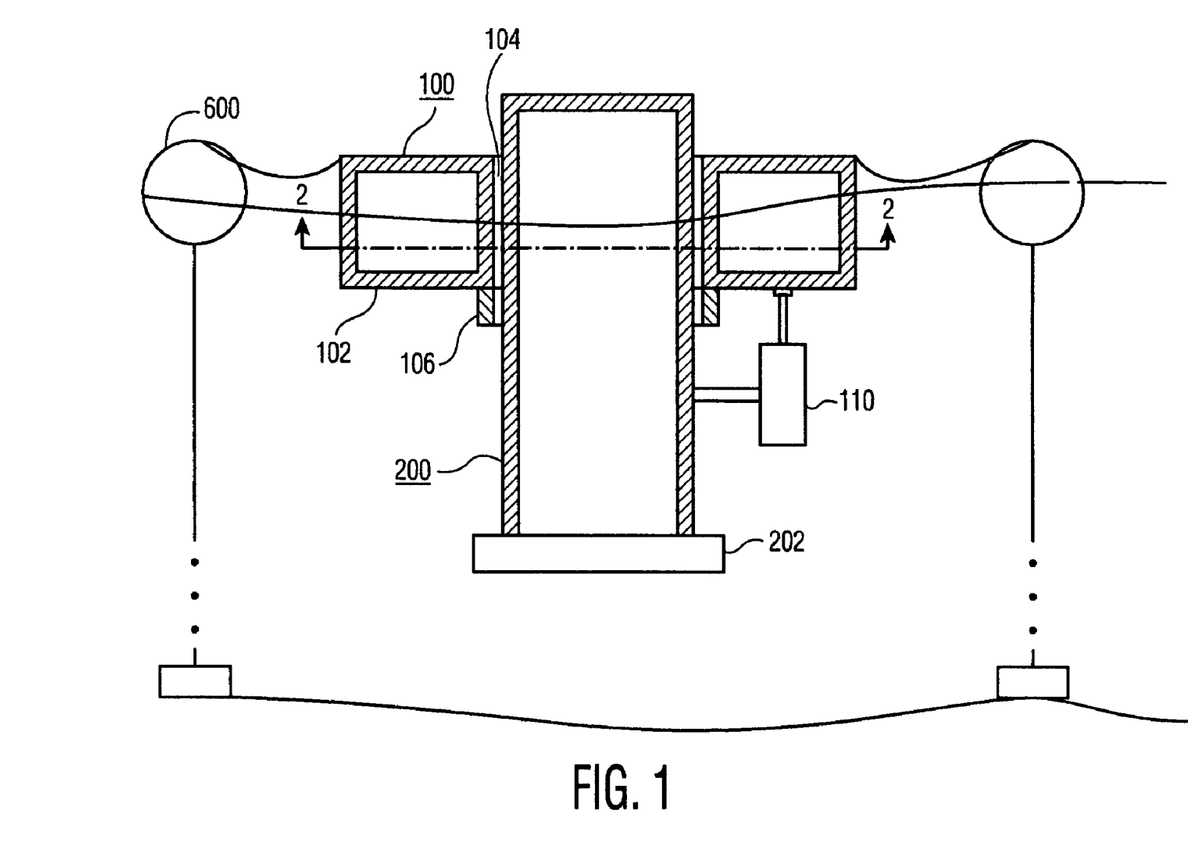
FIG. 1 is a vertical section of a system according to the invention deployed in a body of water.
Figure 2:
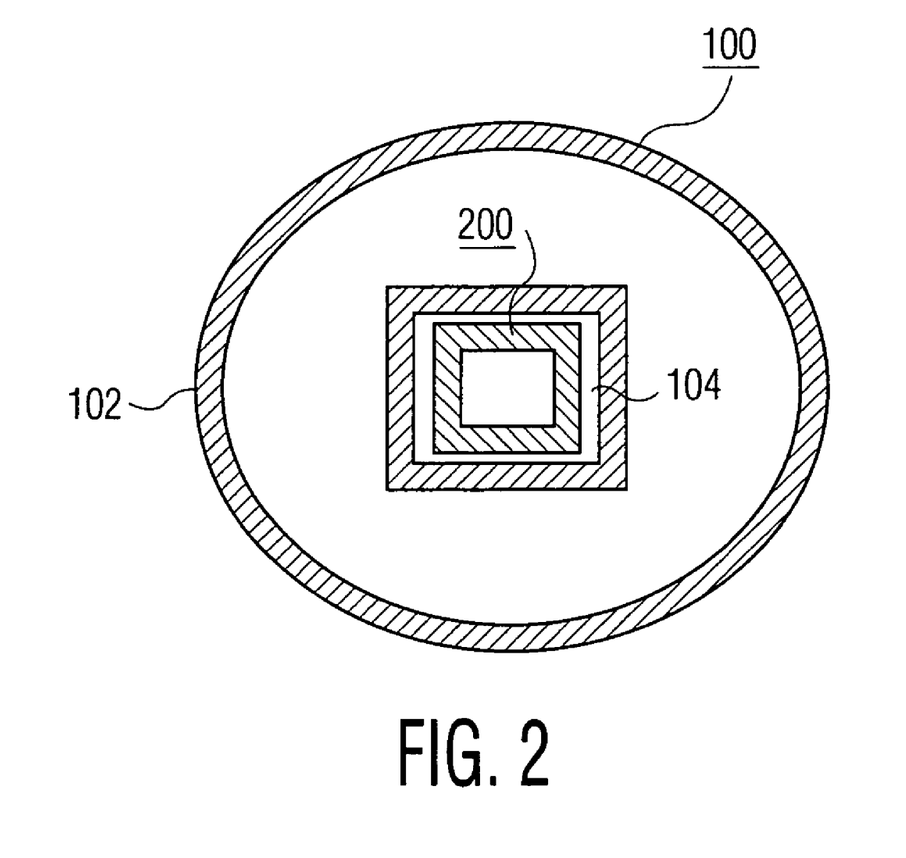
FIG. 2 is a horizontal section taken along line 2—2 of FIG. 1.

One embodiment according to the present invention is illustrated in FIGS. 1 and 2. Therein, two floats 100 and 200 are shown; the float 100 being generally "flat", in the sense of having a relatively large horizontal surface area with a relatively small submerged depth; and the float 200 having a relatively small horizontal surface and a relatively large submerged depth. By "horizontal surface" is meant that plane of a float lying in the plane of the mean level surface of the water. Hereinafter, such horizontal surfaces are referred to as "waterplane areas".

The float 100 has an annular shape, including a rim 102 enclosing a central opening 104. The float 200 is elongated and extends through the central opening of the float 100.

The physical characteristics of the two floats are selected such that they move generally out of phase with one another in response to passing waves.

Figure 3:
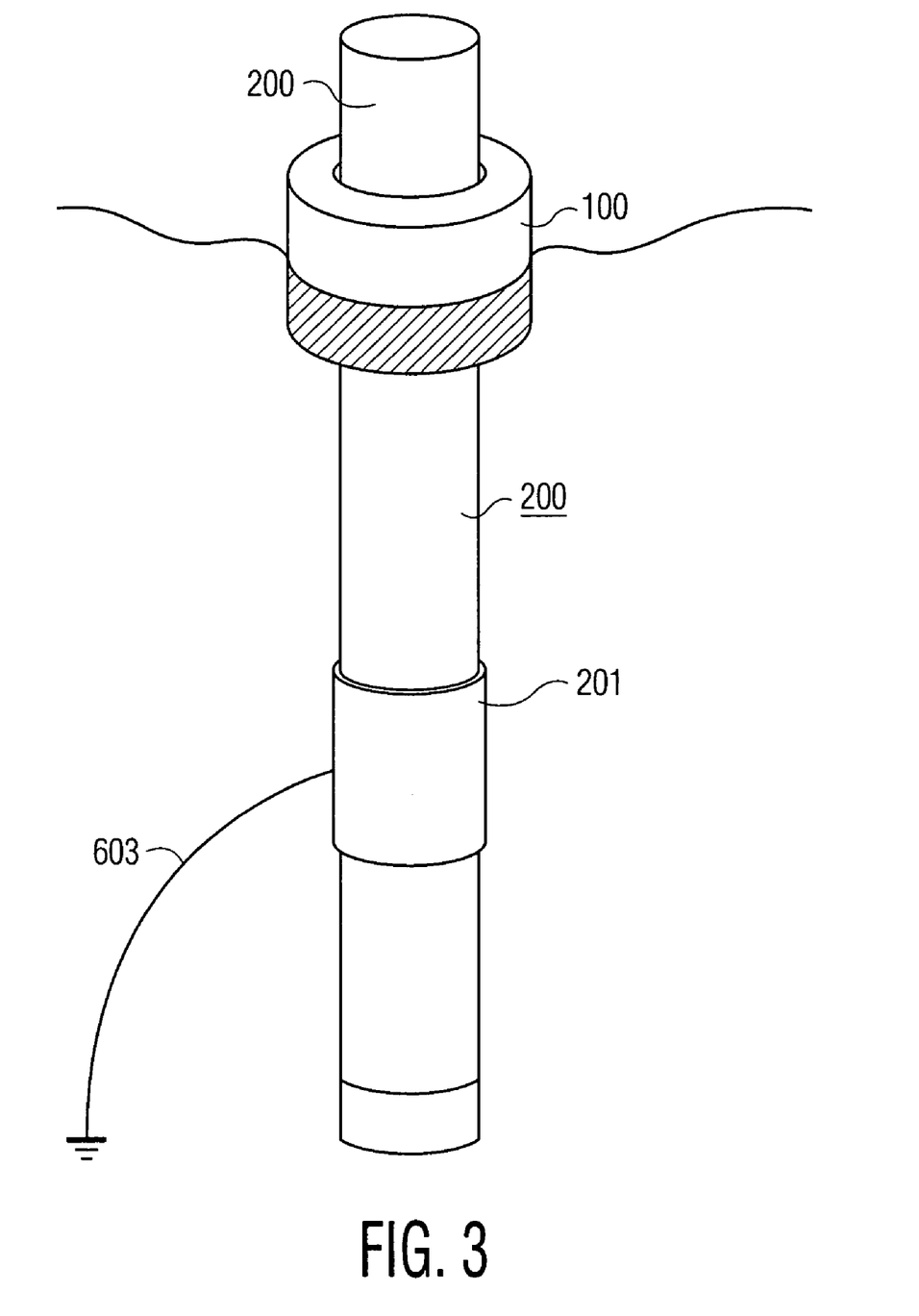
FIG. 3 is a view in perspective showing a variation of a mooring arrangement shown in FIG. 1.

FIG. 1 also shows, schematically, a mooring arrangement for the dual float system. Thus, separate buoys 600 are provided fixedly anchored in place. The buoys 600 are loosely connected, by flexible cables, to the float 100 which is thus free to bob up and down while being moored in place. FIG. 3 shows an alternative arrangement with a loose fitting collar 201 slidably disposed on the float 200. The collar 201 is anchored by one or more cables.

It can be shown that whether a float heaves in-phase or out-of-phase with a passing surface wave is dependent on whether the float displaces a small or large volume of water relative to the float's waterplane area. In the case of in-phase motion, the float displaces a relatively small volume of water for a given waterplane area, and may be described as a low-inertia float. Conversely, for the case of out-of-phase motion, the float displaces a relatively large volume of water for a given waterplane area, and may be described as a high-inertia float. It can be shown that the properties of a float relative to a surface wave of angular frequency $\omega$ are such that the float displays in-phase or out-of-phase behavior depending on the relative values of $g/Z$ which are greater or less, respectively, than $\omega^2$, where:

$\omega$ is the angular frequency of the passing surface waves;

g is the acceleration due to gravity; and

Z is the "effective depth" of the float where:

$$Z = V_D / A_s \qquad (1)$$

where:

$V_D$ is the volume of water displaced by the float including hydrodynamic added mass effects; and $A_s$ is the waterplane area of the float.

Thus, for the float 100, moving in phase with the passing waves:

$$g/Z > \omega^2 \qquad (2)$$

or $$Z < g/\omega^2 > V_D/A_s \qquad (3)$$

The expression $g/\omega^2$ is known as the "resonance depth", i.e., a body with an effective depth (Z) equal to the resonance depth will have a natural period of oscillation equal to the frequency of the surface waves.

Floats, such as the float 100 shown in FIG. 1, having effective depths less than the resonance depth tend to bob up and down in phase with the passing waves.

Conversely, floats having effective depths, Z, greater than the resonance depth tend to bob up and down out of phase with the waves.

For floats having an effective depth close to the resonance depth, the phase relationships between the floats and the waves can be variable, depending upon various damping effects such as viscous damping. Accordingly, for definite in and out of phase movements of the floats relative to the waves and to one another, the effective depths, Z, of the floats are designed to be either greater or less than the resonance depth. As noted, the effective depth, Z, is equal to the displacement of a float divided by its waterplane area $A_s$. For a given volume, related to the desired power generation of the system, the principal design variable is the area $A_s$. From Equation (3), with a given $V_D$, a float will move in phase with the surface waves provided $A_s$ is sufficiently large. Conversely, a float will tend to move out of phase with the surface waves provided $A_s$ is sufficiently small.

In FIG. 1, the float 100 has a large $A_s$ relative to the volume of water displaced ($V_D$) by the float; whereas the float 200 has a small $A_s$ relative to its $V_D$.

The buoyancy or "heave" force on a vertically oriented cylindrical float is a function of the water pressure at the bottom of the float multiplied by the float bottom area. When a cresting wave passes a relatively shallow float, the momentarily increased depth of the float gives rise to an increased water pressure at the float bottom and hence an increased force. Due to the low inertia of the float, the float tends to respond immediately to the force, and thus tends to move in phase with the passing wave.

The same forcing mechanism applies with an elongated spar except that the increased inertia of the spar causes the spar to tend to be out of phase with the passing wave. (It is known, for a sinusoidally forced high-mass system with negligible position-dependent restoring forces, that the motion of the system tends to be out of phase with the forcing on said system.)

A further factor influencing the movement of a float is that the amount of water pressure increase at the bottom of the float in response to a passing wave crest decreases with increasing depth of the float. Because vertical movements of the floats in response to passing waves are in response to water pressure variations at the bottom of the floats, reductions in such water pressure variations reduce the forces applied to the floats. This reduction of water pressure variation or heave force with depth is known, and for an upright floating spar, the manner in which the heave force on the spar varies with depth is given by the equation:

$$\sigma = \cosh[K(d-D)]/\cosh(Kd) \qquad (4)$$

where:

K is the wavenumber, defined as $2\pi/\lambda$, where $\lambda$ is the distance between wave crests (i.e. the wavelength)

d is the depth of the body of water; and

D is the draft or submerged length of the spar relative to the mean water level.

The factor $\sigma$ is based on pressure due to surface waves propagating in the absence of any impediment (i.e. the float) and hence is closely related to the known "Froude-Krylov" force. Specifically, $\sigma$ is the ratio of the Froude-Krylov force for a given floating body to the Froude-Krylov force integrated along the underside of the waterplane area of that body.

In deep water, d>>D, the reduction of water pressure variation defined in Equation 4 may be expressed as:

$$\sigma = \exp(-KD). \qquad (5)$$

This $\sigma$ factor affects both the shallow and elongated floats, and preferably the $\sigma$ of each float is as large as possible. Accordingly, in some embodiments of the invention, each has as short an effective depth as possible within the constraint of Equation 3. Another practical constraint is that the shallow float should have an effective depth not less than the typical wave amplitude to assure hydrodynamic interaction between the shallow float and the wave.

In one embodiment, the shallow float, which tends to move in phase with the wave elevation, has an effective depth Z that is substantially less than the resonance depth. The spar, which tends to move out of phase with the wave elevation, has an effective depth Z that is not much larger than the resonance depth. In connection with typical power take-off devices which function most efficiently at higher speeds, it is beneficial to make the effective depth Z of the elongated spar as close to the resonance depth as possible so as to increase its oscillation amplitude. This increase in oscillation amplitude leads to more efficient conversion of energy by the power take-off device.

By way of example of a system according to this invention, and in reliance upon Equation (2) for the float 100 (and the inverse of Equation (2) for the spar, i.e., $g/Z < \omega^2$), assume that the system is intended for use where the surface waves have a dominant wave period of T=8 seconds ($\lambda$=100 m, k=0.063, $\omega = 2\pi/T$, so $\omega^2 = 0.62$ sec$^{-2}$). Consequently, g/Z for the float 100 must be greater than 0.62 sec$^{-2}$, and g/Z for the spar must be less than 0.62 sec$^{-2}$. Taking 9.81 m/s$^2$ as the acceleration due to gravity, the float 100 must have an effective depth Z less than 15.9 m, and the spar 200 must have an effective depth greater than 15.9 m.

Further by way of example, assuming a circular float 100, for ease of mooring (as explained hereafter), and dominant surface waves of 100 meters wavelength, the float outer diameter is 2 meters and has a central opening of 1.2 meters. The waterplane area of the float 100 is thus approximately 2 square meters. For stability, the float 100 is ballasted to have ½ of its height below water. Thus, with a total height of 3.0 meters, the float submergence depth is 1.5 m.

The force tending to lift the float is a function of the area of the float which, in the above example, is approximately 2 square meters.

The spar float 200, in this example, is a cylinder having an outer diameter of 1.15 meters, hence a waterplane area of approximately 1.0 square meters. The height of the float is 20 meters and the float is ballasted to have a submerged depth of 17 meters. The effective depth, Z, of the float is thus approximately 17 meters.

The σ factor for the shallow float (assuming deployment in deep water) is exp(−kZ)=exp(−0.063*1.5)=0.91. The σ factor for the elongated spar is exp(−kZ)=exp(−0.063*17) =0.35.

Due to the higher σ factor for the shallow float, which corresponds to increased wave forcing pressure, the waterplane area of the shallow float is, in one embodiment, larger than the waterplane area of the elongated spar. In one embodiment, the ratio of the waterplane area of the shallow float to that of the elongated spar is not too large, or the mass of the elongated spar will be inadequate for it to react against the power take-off device disposed between the two components.

How the two floats are configured to obtain the desired relationships is a matter of choice to the designer. A feature of the present invention, however, is the particular relationship between the two floats 100 and 200. Thus, by disposing the float 200 within the central opening 104 of the float 100, the movements of the two floats relative to one another are constrained, with the float 100 serving as a bearing for the float 200. To further control the relative movements between the two floats, a collar 106 can be added to the float 100 as shown in FIG. 1. Also, for biasing the spar 200 to remain in upright position, the lower portion of the float is preferably weighted, i.e., by a weight 202 shown in FIG. 1.

Figure 4:
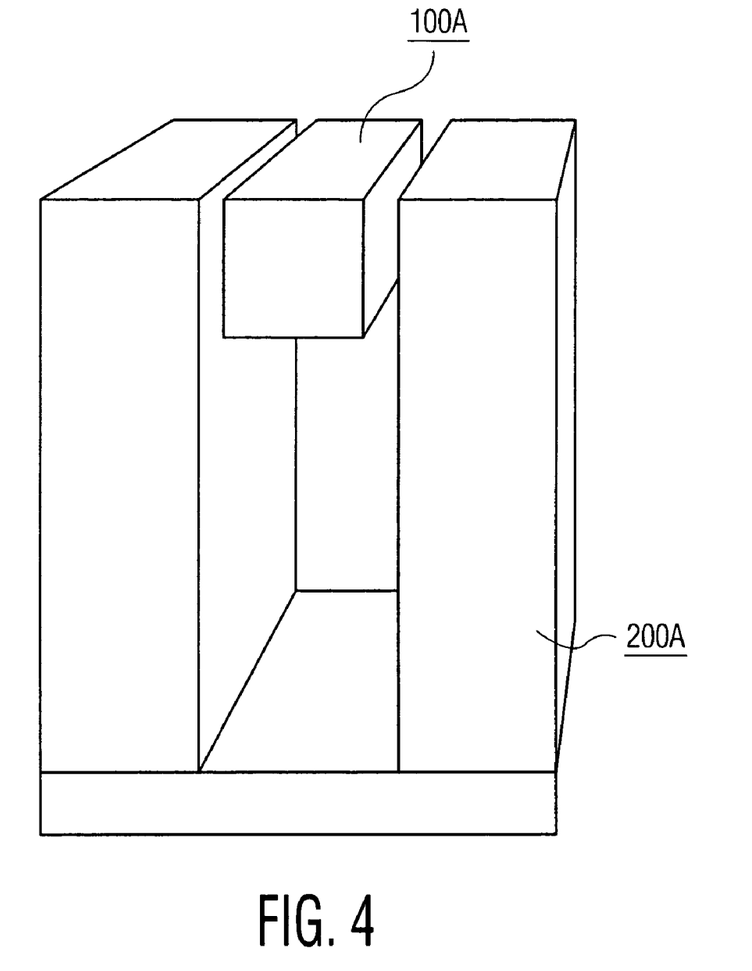
FIG. 4 is a view similar to FIG. 1 but showing a variation of the mechanical configuration of the system.

In FIG. 4, the bearing function of the floats is reversed. The elongated float 200A encompasses the flat float 100A and provides a bearing surface for the float 100A.

Energy is converted by virtue of relative movements between the two floats and a suitable energy converter, e.g., a hydraulic pump 110 shown in FIG. 1, connected between the two floats. While relative vertical movements are required, uncontrolled angular rotation of the two floats relative to one another is preferably restricted to avoid the need for complicated interconnections to and between the floats. To this end, the cross-sections of the inter-fitting float parts are preferably non-circular. For example, as shown in FIG. 2, the shape of the central opening 104 through the float 100C and the corresponding cross-sectional shape of the float 200C are rectilinear.

In FIG. 2, the float is shown of circular outer shape. This provides the advantage that no particular orientation of the float is required with respect to the passing waves. A limitation on the diameter of the float, however, is that it be relatively small in comparison with the wavelength of the passing waves, e.g., not more than 10% of such wavelength. This is to avoid "cancellation" effects, i.e., when the float is simultaneously exposed to both lifting and falling forces. For example, if the float diameter were equal to a surface wave wavelength, the net heave force on the float would be zero.

One means for increasing the size of the float 100 while avoiding cancellation effects is to enlarge the float in a direction perpendicular to the direction of advance of the waves. This requires, however, that the proper orientation of the float be maintained relative to the wave direction.

The two floats 100 and 200 acquire kinetic energy as they bob up and down in response to the passing waves. One means for extracting energy from the moving floats is to interconnect each float to a separate energy converter, e.g., a hydraulic pump, connected between a respective float and a stationary ground point, e.g., the ocean bed. An advantage of the dual float system of the present invention, however, is that each float can serve as a ground point for the other, with neither float rigidly interconnected to the ocean bed. This is particularly advantageous in deep water situations.

Thus, as shown in FIG. 1, for example, an energy converter, e.g., a hydraulic pump 110, can be interconnected between the two floats with the relative vertical motions of the two floats being used to pump the pump 110 for pressurizing a hydraulic fluid therein. The fact that the two floats are constrained to move in preselected paths relative to one another greatly simplifies the mounting and interconnecting of an energy converter on and between the two floats.

Figure 5:
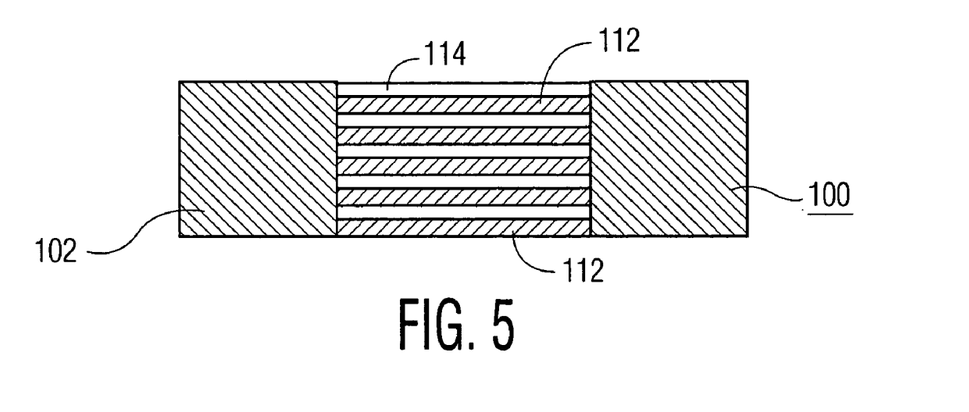
FIG. 5 is an enlarged view in section showing electrical elements of a linear electrical generator in one of the floats.
Figure 11:
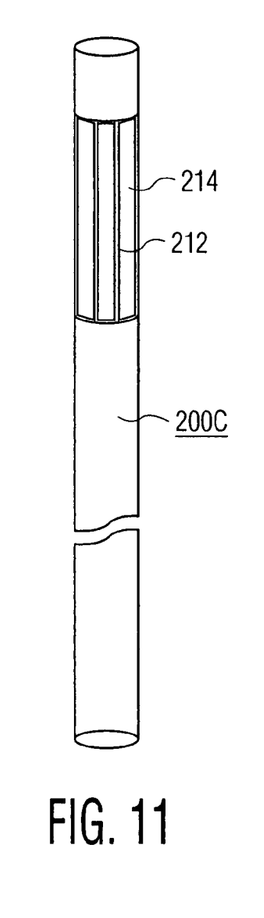

In one embodiment, electrically conductive members comprising elements of an electrical generator are provided on the surfaces of the two floats which slide past one another, i.e., conductive elements 112 (FIG. 5) are provided on the inner surface 114 of the rim 102 of the float 100, and conductive elements 212 (FIG. 11) are provided on the outer surface 214 of that length of the float 200 which slides within the float central opening 104. The relatively movable conductive members can be configured to comprise a linear electrical generator.

Figure 6A:
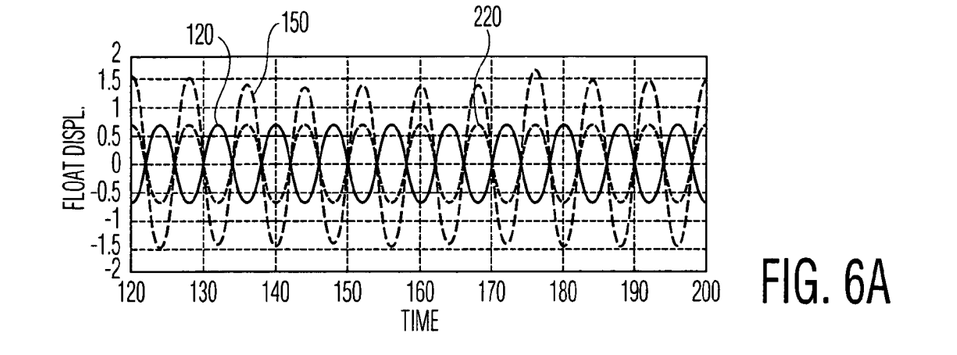
FIGS. 6 and 7 show a series of graphs illustrating the phase relationships among the system components shown in FIG. 1 and surface waves driving the system.
Figure 6B:
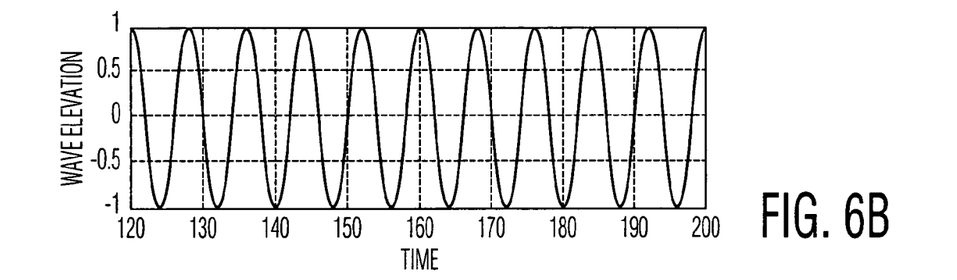

As described, the two floats tend to move in opposite vertical directions in response to passing surface waves. This is illustrated in FIG. 6 where, in graph A, vertical movements of the two floats are plotted against time.

In graph B, vertical movements of passing surface waves are plotted against the same time scale as used in Graph A. In Graph A, the vertical movements of the float 100 are shown by the curve 120 and those of the float 200 by the curve 220. Curve 120 for the float 200 is in phase with the surface waves, while curve 220 for the float 200 is 180° out of phase with the waves. Curve 150 plots the relative movements or separation between the two floats 100 and 200.

Figure 7A:
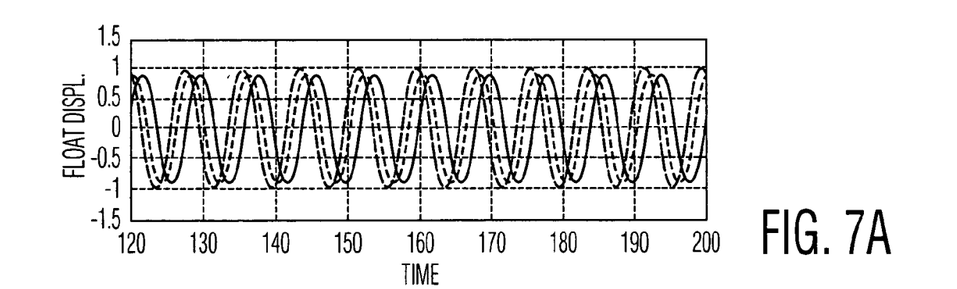
Figure 7B:
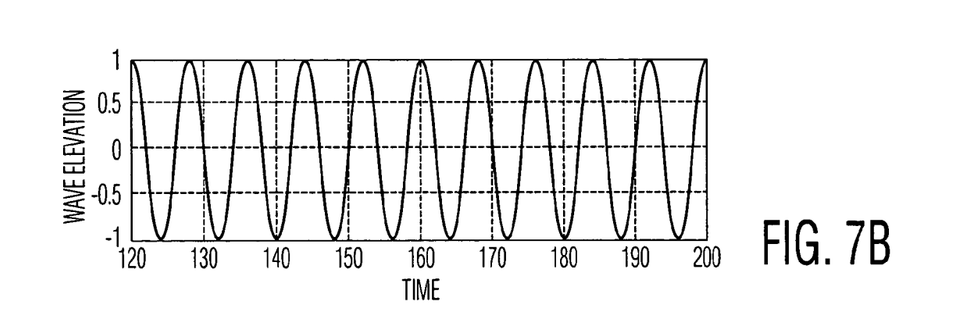

The movements illustrated by curves 120 and 220 for the two floats 100 and 200 are those for freely moving floats. In actual use, the two floats 100 and 200 are interconnected by an energy converter, and the effect of such interconnection, and energy removal from the floats, is shown in Graph C in FIG. 7. Because of the interconnection between the two floats, through the energy converter, the two floats are no longer 180° out of phase with one another.

Figure 8:
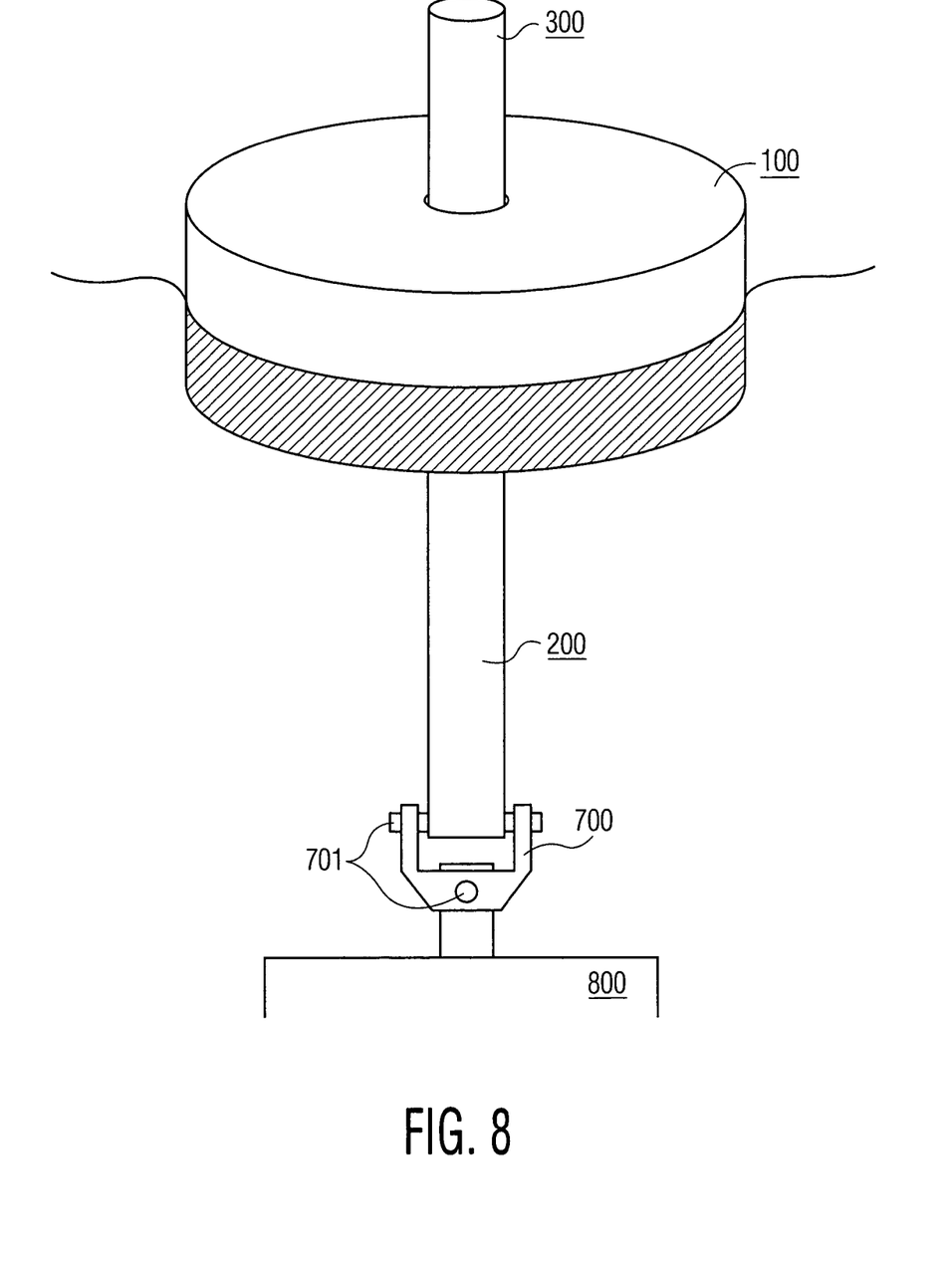
FIG. 8 shows a single float system.

As noted, the float 100 serves as a bearing for the spar float 200 in the embodiment shown in FIG. 1, and vice versa in the FIG. 4 embodiment. The illustrated mechanical interaction between the two floats, for maintaining them in desired physical relationships even in a heaving water surface, is so advantageous that such mechanical relationship is retained in a system illustrated in FIG. 8. As shown, only one float, e.g., the float 100, is free for vertical movements, while the other float, the spar 200, is fixedly anchored to the ocean floor by means of a known type of gimbal joint 700 allowing tilting of the spar but no vertical movements. Thus, only the float 100 moves in response to the passing waves for capturing energy from the waves While the spar 200 shown in FIG. 8 is vertically stationary, it is an effective means for mooring the float in place while allowing free vertical movements of the float. Additionally, it is generally known that protection of a floating object against storm damage can be obtained by submerging the object. By constraining the vertical movements of the float along the anchored spar 200, protective flooding of ballast tanks in the float 100 can cause it to sink in a controlled manner downwardly along the spar and in fixed location. Upon blowing of the ballast tanks, the float 100 rises to its previous position.

Other features and structural variations of the invention are shown in FIGS. 9–15.

Figure 9:
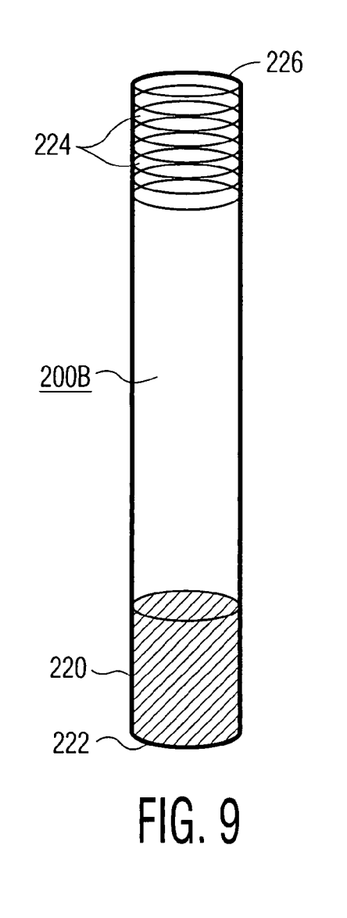
FIGS. 9–14 show modified spar floats useable according to the present invention.

In FIG. 9, a spar 200B is shown having a heavy weight 220 at the bottom end 222 and a plurality of air-filled cells 224 at the top end 226. The arrangement illustrated is effective for maintaining the spar in vertical orientation.

Figure 10:
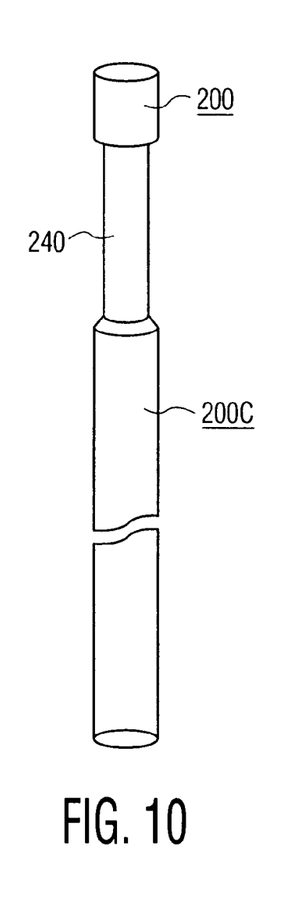

In FIG. 10, a spar 200C is shown with an indented region 240 for receipt, as previously mentioned, of a series of conductive elements 212 (FIG. 11) forming, in connection with conductive elements on the inside surface 115 (FIG. 5) of the annular float 100, a known type of linear generator.

Figure 12:
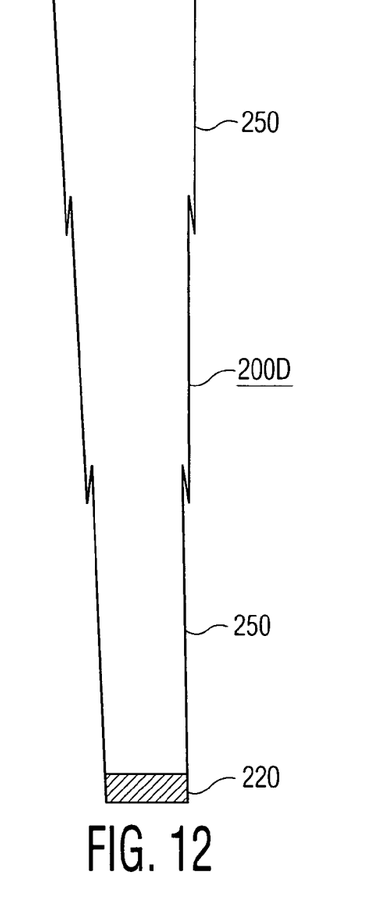
Figure 12A:
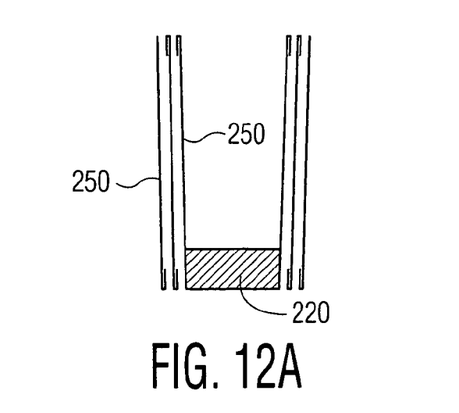

In FIGS. 12 and 12A, a spar 200D comprises a plurality of telescoping concentric pipes 250 for greater ease of storage and transportation. When in use, the adjoining sections are locked together.

Figure 13:
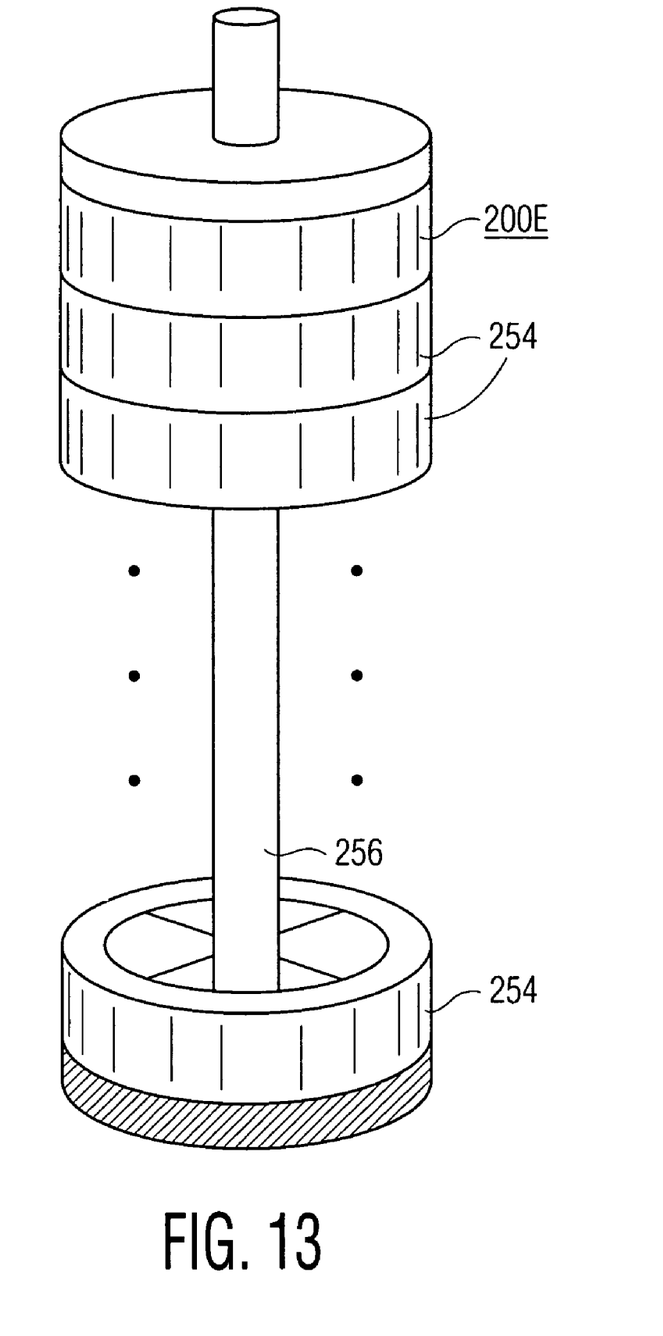

In FIG. 13, a spar 200E comprises a plurality of hollow annular members 254 vertically stacked in fixed angular relation along a central column 256.

Figure 14:
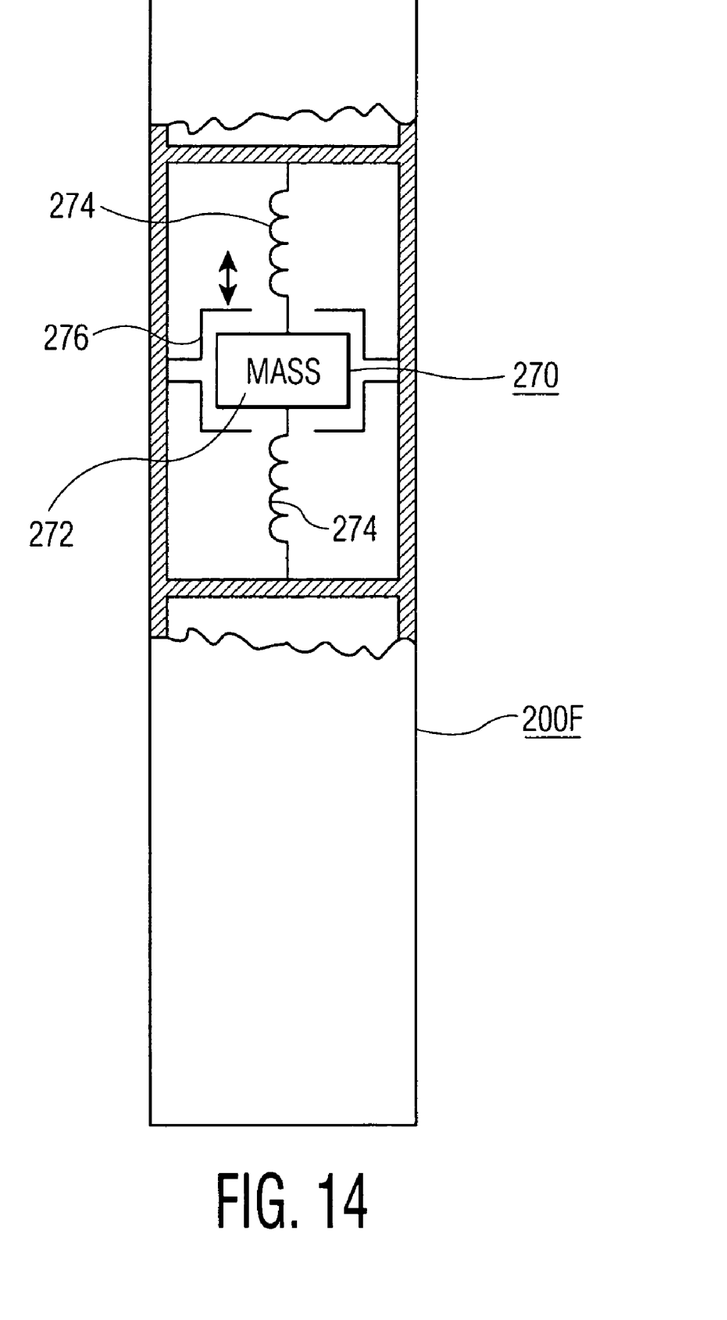

In FIG. 14, a mass—spring system 270 is disposed within a spar 200F. The system includes a weight 272 mounted between two springs 274 and a selectively movable mechanism 276 for allowing or preventing vertical movements of the weight. The effect of this internal degree of freedom of the spar is to increase the lowest natural oscillation frequency of the spar, providing a means for the designer of the WEC apparatus to tune the device for greater energy conversion efficiency. For example, for an embodiment of the present invention intended for deployment in a region where dominant waves have a range of wave periods, it may be advantageous to design an elongated spar to a length which leads to optimal energy conversion for the longer wavelengths. In the presence of long period waves, the mass-spring system 270 is locked against movement, and thus the system is tuned. In the presence of shorter period waves, the mass-spring system is allowed to oscillate, causing the spar to resonate at a frequency closer to that of the shorter period waves, leading to improved energy capture.

Figure 15A:
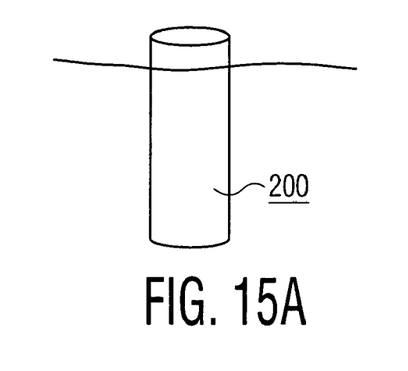
FIGS. 15A–C illustrate, partially by comparison with a spar similar to the one shown in FIG. 1, further variations of spar floats useable according to the present invention.
Figure 15B:
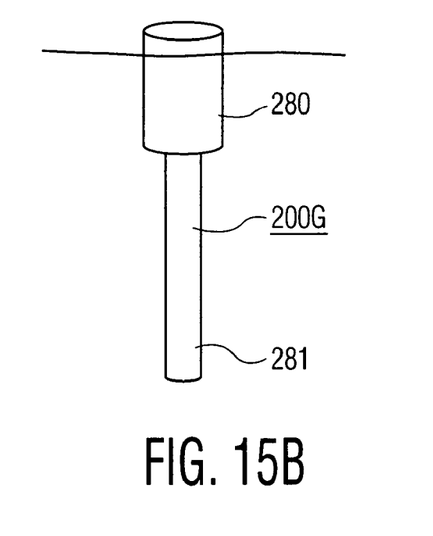
Figure 15C:
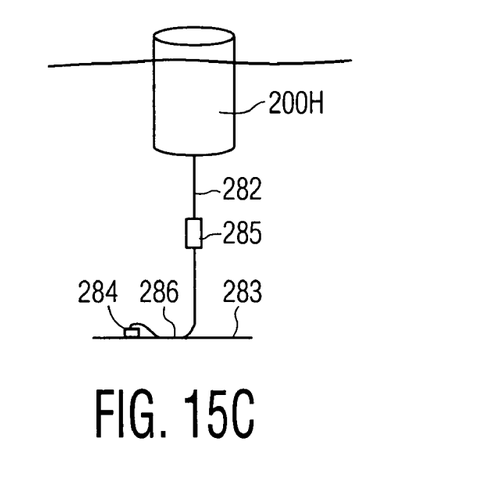

In FIGS. 15A, 15B, and 15C, three possible configurations of spars are shown. FIG. 15A shows a spar 200 similar to the spar 200 shown in FIG. 1 and of a certain waterplane area and a certain effective depth Z. The spar 200 comprises a single cylinder of uniform diameter. In FIG. 15B a spar 200G is shown in a dual-cylindrical configuration, i.e. the spar 200G is comprised of an upper cylinder 280 which has a diameter greater than the diameter of a lower cylinder 281. The spar 200G shown in FIG. 15B is configured such that its waterplane area is equal to that of the spar 200 shown in FIG. 15A. The lower cylinder 218 of the spar 200G is configured such that the total volume of water displaced by the spar 200G is equal to the volume of water displaced by the spar 200 shown in FIG. 15A. Because the spars 200 and 200G have equivalent waterplane areas and displace equivalent volumes of water, they have substantially equivalent effective depths. The advantage to the embodiment of the spar 200G is that its σ factor is greater than the σ factor for spar 200. The increase in σ factor comes about because the lower surface of the upper cylinder 280, in comparison with the lower surface of the spar 200, interacts with a portion of pressure field closer to the surface of the water, hence experiences larger variations in pressure with passing waves. This leads to larger forces for improved power conversion efficiency.

In the spar 200H shown in FIG. 15C, the lower cylinder 281 (FIG. 15B) of the spar 200G is replaced with a dense cable or chain 282, the length of which substantially exceeds the distance from the bottom of the spar 200H to the floor 283 of the body of water. The cable 282 can have multiple floats 285 attached along its length, the purpose of which is to assure that the volume of the cable 282 plus the volume of the floats 285 equals the volume of the lower cylinder 281 of the spar 200G.

The advantage to the FIG. 15C embodiment is that the lower end of the chain or cable can be fixed to an anchor 284 on the floor 283, thus providing a means for mooring the spar. In one embodiment, a lower length 286 of the cable 282 rests on the floor 283, which cable length varies as the spar heaves with passing waves. Preferably, the density of the cable lower length 286 is significantly less than that of the remainder of the cable such that variations in the hanging length of the cable with vertical movements of the spar do not substantially change the buoyancy characteristics of the spar 200H.

Figure 16:
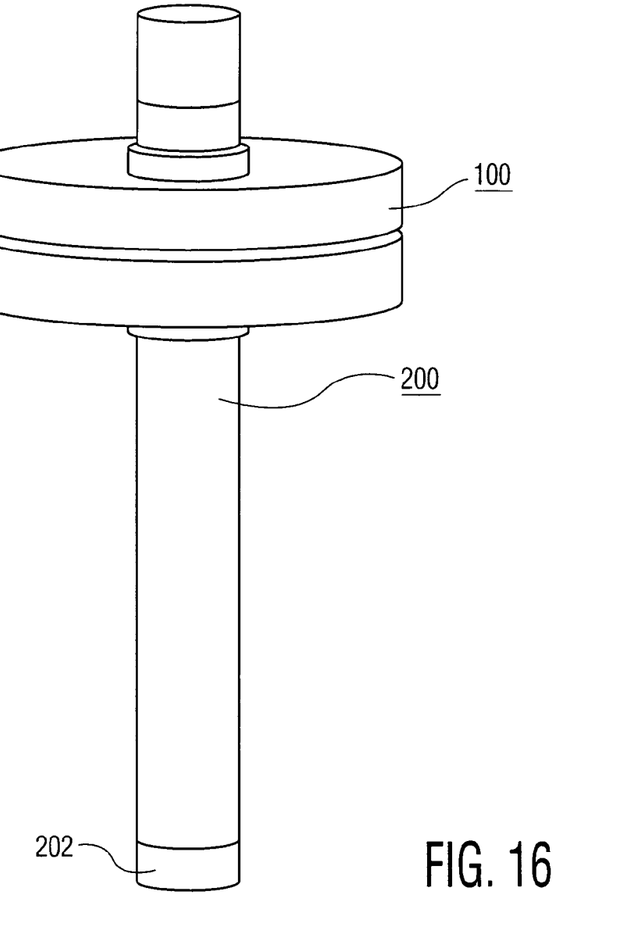
Figure 17:
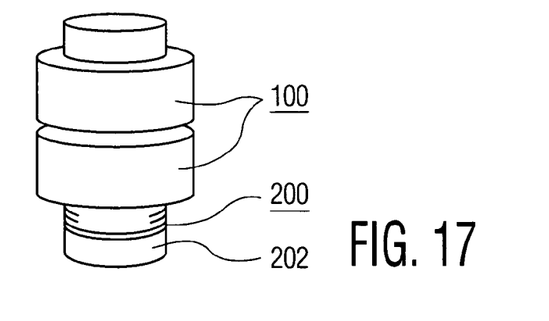
FIG. 17 shows the same system shown in FIG. 16 in deflated condition.

FIG. 16 shows a float 100—spar 200 system similar to that shown in FIG. 1 except for the materials used. Thus, both the float and the spar are made from impervious, stretchable materials, and the structural shapes shown in FIG. 16 are obtained by filling structures shown in FIG. 17 with water and pressurized air. The float and spar are closed, hollow members formed from commercially available materials used, for example, in inflatable rafts, e.g., PVC coated rubber tubing. In the empty condition shown in FIG. 17, the spar is folded along horizontal pleats, accordion style, and pouring water into the spar causes it to expand. The desired final weight and buoyancy of the spar is tuned by the quantity of air pumped into the spar. A weight is fixedly contained in the spar lower end. The float shown in FIG. 17 is likewise caused to expand into the size shown in FIG. 16 by adding water and pressurized air. When deployed, the system functions as does the system shown in FIG. 1.

What is claimed is:

1. Apparatus for capturing energy from surface waves on a body of water comprising first and second floats, said first float having a generally flat configuration, and said second float being configured as an elongated spar, the draft of said first float being substantially less than the draft of said second float, each float having an intercept with the water surface, a power take-off element connected between said floats for converting relative movements therebetween into useful energy, said floats being configured to rise and fall in response to passing surface waves in out-of-phase relation with one another for causing relative movements between said floats, and said first and second floats having configuration values g/Z which are greater and less than $\omega^2$, respectively, where:

g=acceleration due to gravity;

Z=the effective depths of the floats; and

ω=the angular frequency of the passing waves; and where:

Z(effective depth)=$V_{D/A_s}$, where:

$V_D$ is the volume of the water displaced by the float including hydrodynamic added mass; and $A_s$ is the waterplane area of the float.

2. Apparatus according to claim 1 when the value of g/Z for said first float is greater than 0.63 sec$^{-2}$ and the value for g/Z for said second float is less than 0.63 sec$^{-2}$; and the value of Z for said first float is less than 15.9 meters and the value of Z for said second float is greater than 15.9 meters.

3. Apparatus according to claim 1 wherein said first float is configured as a circular member including an annular rim enclosing a central opening, and said second float is configured as an elongated spar.

4. Apparatus according to claim 3 wherein said spar is disposed centrally of said circular member for vertical movements relative to said first float in response to passing surface waves.

5. Apparatus according to claim 4 wherein said spar is in sliding contacting relationship with an inner surface of said annular rim for controlling the relative angular positions of said spar and said rim during said relative vertical movements between said spar and said circular member.

6. Apparatus according to claim 5 wherein said sliding contacting relationship is such as to provide a fixed angular relationship between said spar and said circular member for all relative vertical positions therebetween.

7. Apparatus for capturing energy from surface waves on a body of water comprising first and second floats of different shapes and different drafts for rising and falling in out-of-phase relationship with one another in response to passing waves for causing relative movements between the floats, said first and second floats have configuration values $g/Z$ which are greater and less than $\omega^2$, respectively, where:

$g$=acceleration due to gravity;

$Z$=the effective depths of the floats; and $\omega$=the angular frequency of the passing waves; and where:

$Z$(effective depth)=$V_{D/As}$, where:

$V_D$ is the volume of the water displaced by the float including hydrodynamic added mass; and $A_s$ is the waterplane area of the float, and a power take-off element connected between said floats for converting relative movements between the floats into useful energy.

* * * * *